INVENTOR.
JAMES STILWELL
BY
Caesar and Rivise
ATTORNEYS.

INVENTOR.
JAMES STILWELL
BY
Caesar and Rivise
ATTORNEYS.

INVENTOR.
JAMES STILWELL
BY
Caesar and Rivise
ATTORNEYS.

United States Patent Office 3,374,447

Patented Mar. 19, 1968

3,374,447

PLUGGABLE FILTER ASSEMBLY FOR USE IN ELECTRONIC DISTRIBUTION SYSTEM

James Stilwell, Maple Glen, Pa., assignor to Telesystems Corporation, Glenside, Pa., a corporation of Pennsylvania Filed Aug. 12, 1964, Ser. No. 389,105
8 Claims. (Cl. 333—70)

This invention relates to a pluggable filter assembly for use in electronic distribution system and relates to a novel device of a class not heretofore recognized in the art.

In the installation of community antennae systems, it is common practice to provide radio frequency transmission lines of extended lengths in order that the television signal may be transmitted to many distant areas from a master antennae system. Such radio frequency transmission lines require alternating current powered amplifier or booster equipment at periodic intervals in order that the television signal will be of adequate strength at all points in the system. In the erection of the aforesaid systems, it is necessary to protect the power lines connected into the amplifier or booster equipment from overloading. This is done by means of the provision of circuit breakers in a manner well known in the art. It is also necessary to provide filter elements in the power lines adjacent the booster equipment in order to screen out undesirable radio frequency signals that will be picked up by the power lines. The filter elements have a second function of preventing the escape of desirable radio frequency signals which could foul neighboring reception.

Towards this end there is now in wide use a combination filter and circuit breaker that is installed at each booster equipment location in the system for the aforesaid purposes of protection, screening out of undesirable radio frequencies and retention of desirable radio frequencies.

The aforesaid filter-circuit breaker combination has been found to perform generally satisfactorily and is relatively maintenance free. The latter consideration is quite important in view of the complexity of the community systems.

However, the aforesaid filter-circuit breaker combination has proven to be vulnerable to momentary overloads that do not actuate the circuit breaker. This arises principally when the power lines are struck by lightning and in view of the time and effort involved in installing a replacement, the problem has proved to be a substantial one.

The circuit breaker employed in the aforesaid filter-circuit breaker combination is of the usual time-delay construction so that a momentary overload will not actuate the circuit breaker.

When lightning strikes the power line, there is a momentary heavy surge of electricity. In view of the extremely short time duration of the surge, the time-delay circuit breaker generally is not actuated. Therefore, the aforesaid momentary heavy short time duration surge passes through the filter element and usually immediately immobilizes the filter element or causes a short circuit that trips the circuit breaker. Where the filter element is immobilized the reception by subscribers will usually be of poor quality. Where, the circuit breaker is tripped, all service beyond that point will cease since the system is wired in a cascade pattern which is somewhat in the nature of a series circuit.

It has not proven practical to provide a filter element that could resist the high surges of electricity occasioned by the lightning and therefore a substantial maintenance problem in community antannae systems has arisen with respect to the filter elements.

After the filter element has become immobilized or the circuit breaker tripped, it is then necessary to send a maintenance man to the spot, and under present practice the maintenance man must completely disrupt the service to all subscribers beyond the immobilized filter. More specifically, the maintenance man must break the connections to the circuit breaker filter combination, remove the existing combination and attach a new one. This is time-consuming as well as costly especially since the circuit breaker element is completely undamaged.

It is therefore a principal object of the present invention to provide a combination filter-circuit breaker that will not have the shortcomings of the devices presently in use.

Yet another object of the present invention is to provide a pluggable filter assembly whereby the circuit breaker component will remain permanently installed in the power line at all times and the filter component when immobilized may simply be unplugged and replaced with a new filter component in an operation that can be measured in seconds thereby almost completely avoiding the problem of power interruption for considerable times, a problem which is of considerable concern in view of the complexities of the community antannae systems and the interruption of service to large groups of subscribers.

Still another object of the present invention is to provide a pluggable filter assembly that can be made operable in a matter of seconds even when the filter section has been immobilized by a temporary lightning surge.

The aforesaid as well as other objects of the present invention are achieved by providing a pluggable filter assembly for use in a power line that basically comprises an upper pluggable filter component and a lower receptacle-circuit breaker component. The filter component includes a series of service receptacles that are electrically connected to a filter element from which a male plug depends. The circuit breaker component includes a circuit breaker having a main receptacle associated therewith and adapted to receive the aforesaid plug element. When the filter element is immobilized by a lightning surge, it is a simple matter for a service man to disconnect the disabled filter component by a mere pull to separate the pluggable filter element from the receptacle-circuit breaker unit and then to insert a new filter component by a plugging action. When, a new pluggable filter element is not readily available, the old filter element can be temporarily bypassed by disconnecting the main male plug from one of the receptacles of the filter component and inserting it in the main receptacle of the circuit breaker element.

This has the effect of immediately bypassing the disabled filter component and permitting service to continue. While this service will not be of a superior quality because the undesirable radio frequency will be passing to the subscriber's set and some desirable radio frequency escaping therefrom, at least the service will continue essentially uninterrupted. This is a situation which is vastly superior to the present existing one where it is necessary to disrupt service beyond the disabled filter element while repairs are being made. The present practice is time-consuming and very annoying to the subscribers. With the present invention there is essentially no time lost in transmission.

It is to be noted that the problem solved by the present invention is aggravated by the fact that community television antennae systems cover wide areas in a complex network in urban and rural places. This not only retards the rendering of maintenance service and the problems of keeping an inventory of necessary parts, but the large distance involved in many instances forces the systems to be established on the basis that the service points of the subscribers are effectively connected in cascade (series).

Other objects and many of the attendant advantages of the present invention will be readily appreciated as the same becomes better understood by reference to the following detailed description when considered in connection with the accompanying drawings wherein:

FIG. 1 is a perspective exploded view of the uncoupled filter component and circuit breaker component of the present invention;

FIG. 2*a* is a front elevational view of the device of FIG. 1 on a reduced scale wherein the two components have been united;

FIG. 2*b* is a side elevational view of the device of FIG. 2*a*;

Figure 1:
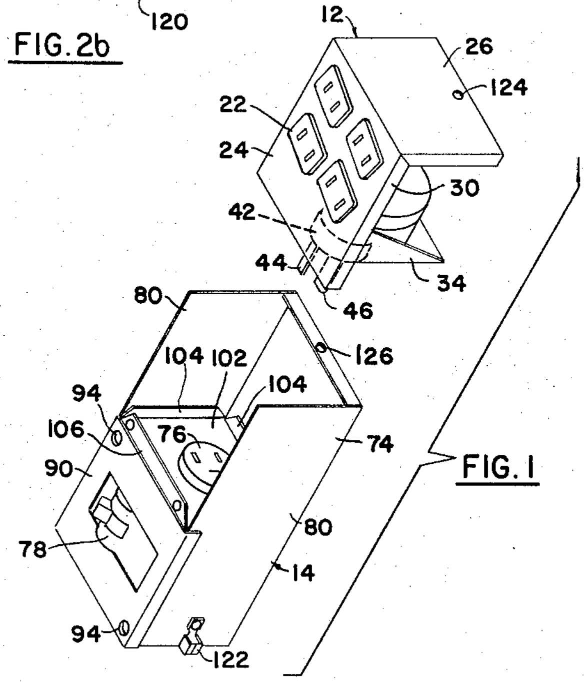

Referring now to the various figures of the drawing wherein like reference numerals refer to like parts, there is shown in FIG. 1 a pluggable filter assembly for use in electronic distribution system comprising an upper pluggable filter component 12 and a lower receptacle-circuit breaker component 14.

Figure 10:
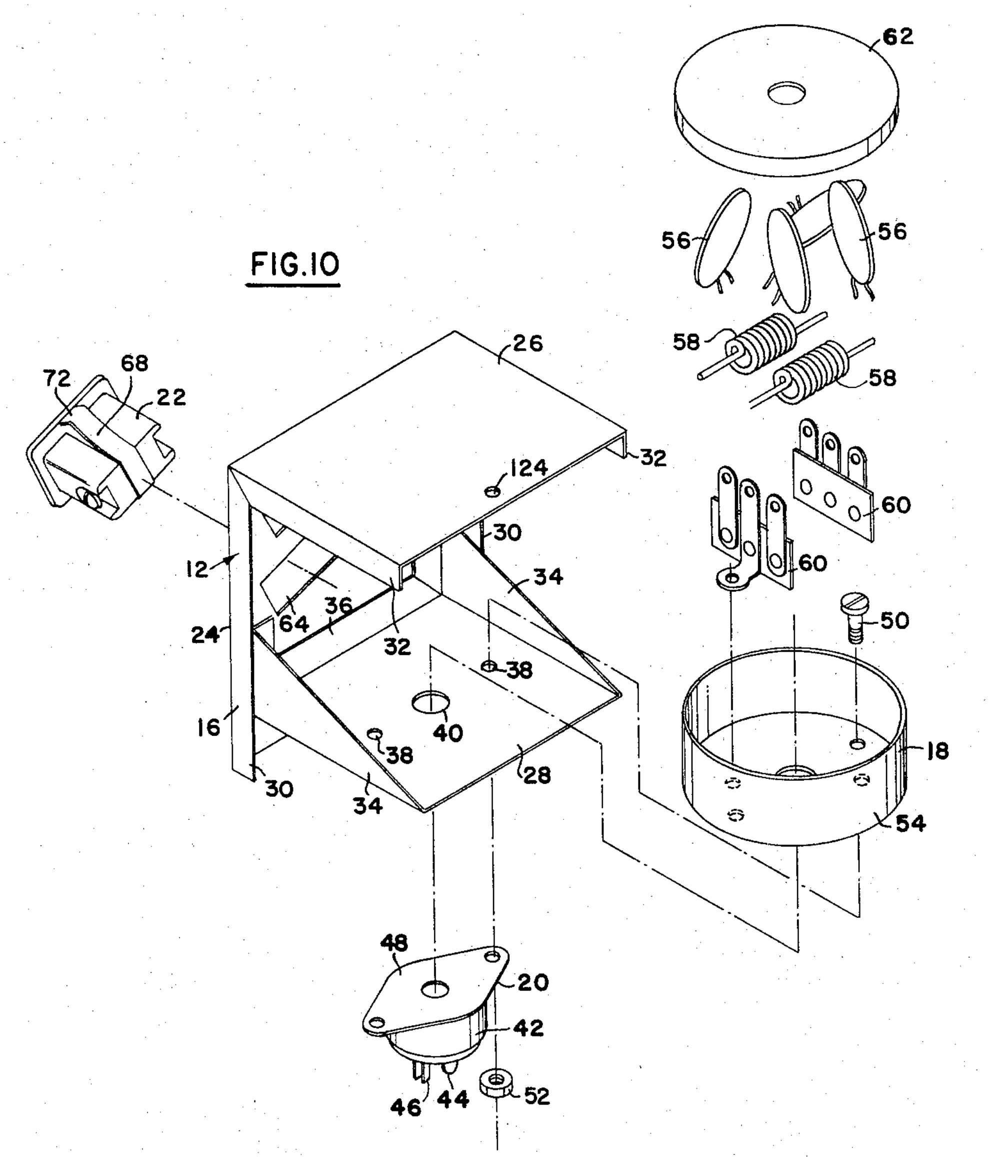
FIG. 10 is an exploded perspective view on an increased scale of the filter component of the present invention taken generally from the rear thereof.

The filter component 12 basically comprises, as shown in FIG. 10, a housing 16 in which is contained the filter element 18 and the plug 20 as well as the service receptacles 22.

Figures 5, 6, 7, 8:
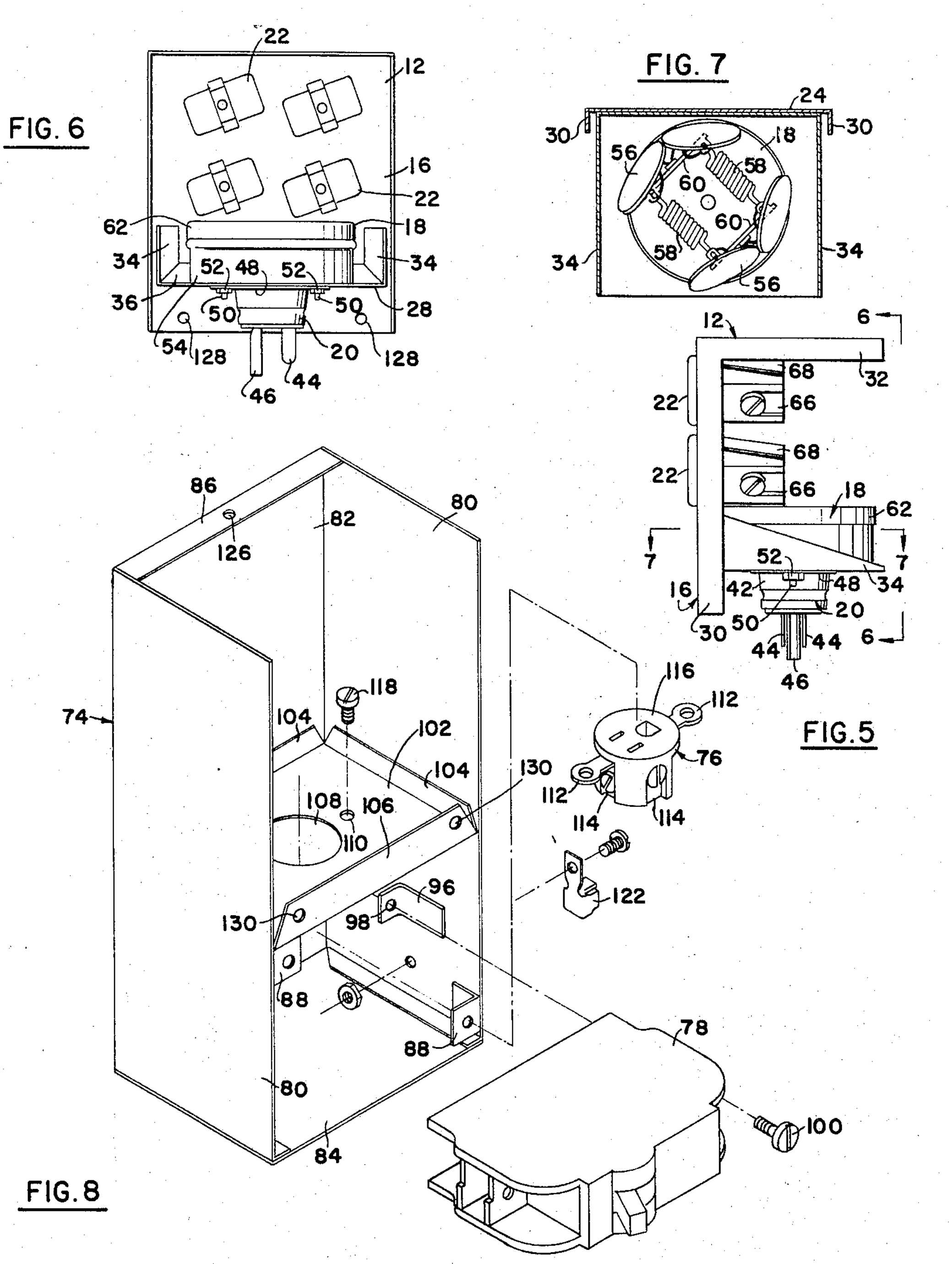
FIG. 5 is a side elevational view of the pluggable filter component of the present invention.
FIG. 6 is a rear elevational view of the pluggable filter component taken along the lines 6—6 of FIG. 5.
FIG. 7 is a sectional view taken along the lines 7—7 of FIG. 5.
FIG. 8 is an exploded perspective view on an increased scale of the circuit breaker component of the present invention with the front plate thereof removed for the sake of clarity.

The housing 16 possesses a front face 24 uniting top 26 and bottom 28. Side flanges 30 extend backwardly from the front face 24 and end edges 32 extend downwardly from the top 26. Triangular edges 34 extend upwardly from the bottom 28. As indicated in FIGS. 6 and 8, the bottom 28 is initially a piece separate from the remainder of the housing 16. The bottom 28 possesses the triangular edges 34 that terminate forwardly in a flange 36 that is welded to the rear face 38 of the housing 16. The top 26, however, is preferably integral with the remainder of the housing 16.

As indicated in FIG. 10, the bottom 28 has side openings 38 formed therein and also has a larger central opening 40. The openings 38 and 40 are for the purpose of permitting plug 20 to be secured to the lower face of the bottom 28. As shown in FIG. 10, the plug 20 comprises a body section 42 from which like prongs 44 and arcuate prong 46 extend in a well known manner for purposes of polarization. Attachment plate 48 with openings complementary to openings 38 and 40 is secured to the rear face of the bottom 28 as shown in FIGS. 5 and 6. Bolts 50 and nuts 52 are utilized for this purpose and also to secure filter element 18 to the top surface of bottom 28 as will be discussed hereinafter.

The filter element 18 is contained in a filter housing 54 that possesses openings in the bottom surface thereof. These openings are complementary with openings 38 and 40 and similar openings in attachment plate 48. Thus, the bolt 50 will pass through the bottom of the filter housing 54, through the bottom 28 of the housing 16 and through the attachment plate 48 in order to secure the respective elements together.

The components contained in the filter housing 54 are of a well known type and construction and need not be discussed in considerable detail. As shown in FIG. 10, the filter components include capacitors 56, inductances 58 and terminal posts 60 that are wired together as indicated schematically in FIG. 9 and as shown in some detail in FIG. 7.

As further shown in FIG. 10, the filter housing 54 has an open end that is closed by cap 62.

Figure 11:
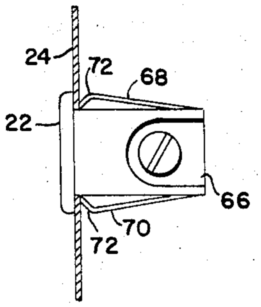
FIG. 11 is an enlarged side elevational view of one of the filter receptacles that is associated with the filter receptacles that is associated with the filter component.

The service receptacles 22 are received in the housing 16 through rectangular slot 64 in front face 24. The service receptacles themselves are of known construction and possess terminals 66 for attachment of appropriate leads. Four service receptacles are present to provide four separate possible connections through filter component 12. One of the receptacles 22 is for the main service connection, and the others are for additional service connections, testing, etc. Also associated with the receptacles 22 are top and bottom leaf springs 68 and 70, each of which terminate forwardly in inwardly inclined lips 72. As shown in FIG. 11, the leaf springs 68 and 70 are inclined away from each other by an increasing amount in the forward sense so that the receptacles 22 can be snapped in place by inserting them through slots 64 from the front of the housing 16. When this is done, the leaf springs 68 and 70 are initially compressed against the body section of the receptacle 22 as it passes through the slot 64. However, as soon as the lips 72 have cleared the slot 64, the leaf springs 68 and 70 snap to the position of FIG. 11 and thus lock the receptacle 22 in place.

Figure 4:
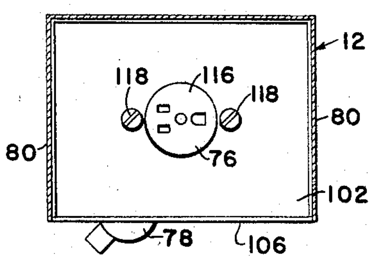
FIG. 4 is a sectional view taken along the lines 4—4 of FIG. 3.
Figure 3:
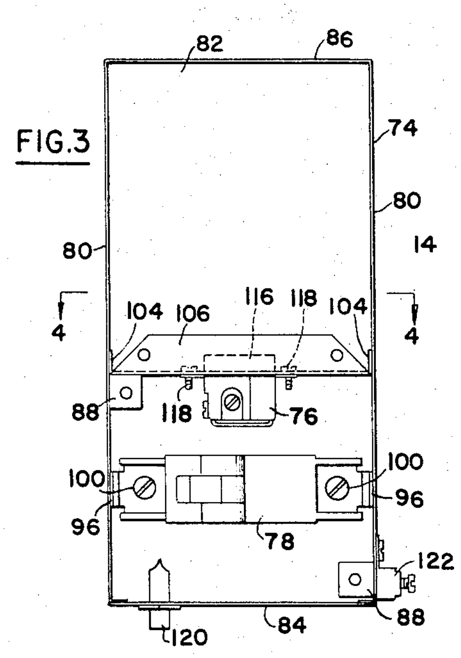
FIG. 3 is an enlarged front elevational view of the circuit breaker component with the front plate thereof removed for the sake of clarity.

Attention is now referred to FIGS. 3, 4 and 8 which illustrate the details of the lower receptacle-circuit breaker component 14. As shown in considerable detail in FIG. 8, the receptacle component 14 is comprised of a housing 74 which contains main receptacle 76 and circuit breaker 78.

The housing 74 includes elongated side panels 80 extending from rear panel 82. A bottom panel 84 is also provided but it is to be noted that the housing 74 essentially lacks a top panel and a front panel. A top ledge 86 is, however, provided to assist in the seating of the pluggable filter component 12 as will be discussed in greater detail hereinafter.

Figure 2A:
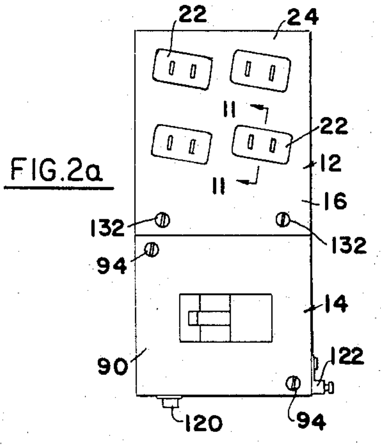
Figure 2B:
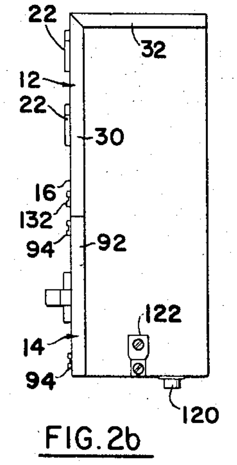

Referring again to FIG. 8, L-shaped tabs 88 are secured to the side panels 80 in order to receive separable lower front panel 90 with side edges 92 as illustrated in FIG. 2*b*. The lower front panel 90 includes openings that are complementary with the openings in the tabs 88 in order to receive bolts 94 with associated nuts and thereby fasten the front panel 90 to the remainder of the housing 74.

Also secured to the interior walls of the side panels 80 are L-shaped brackets 96 which possess openings 98 in order to receive bolts 100 that pass through circuit breaker 78 in order to secure the circuit breaker 78 within the housing 74.

The housing 74 further includes a shelf 102 with upstanding side and end edges 104 welded to the interior panels of the housing 74. The shelf 102 further includes a front edge 106 which aids in the securement of the depending edge of the front face 24 of the filter housing 16. A large opening 108 and side openings 110 are formed in the shelf 102 for reception and securement of the receptacle 76. As shown in FIG. 8, the receptacle 76 is of a well known construction and includes ears 112, terminal posts 114 and a body section 116 of well known construction. In particular, the body section 116 includes openings that are complementary to the prongs 46 and 48 of the plug 20. The receptacle 76 is secured to the top face of the shelf 102 by inserting body section 116 into the opening 108 so that the openings in the ears 112 are aligned with the openings 110 in self 102. Bolts 118 are used to complete the connection.

Also associated with the housing 74 in a well known manner is an indicator light 120 and a grounding post 122.

While the particular type of circuit breaker to be used in connection with the aforesaid invention will occur readily to those skilled in the art, a suggested circuit breaker is manufactured by the Heinemann Electric Co. of Trenton, N.J., and is is identified as Catalog No. 0912, and is rated at 10 amps, 120 volts A.C., and is of the time-delay type.

The filter component 12 is associated with the circuit breaker component 14 by merely bringing the two elements into juxtaposition as generally indicated in FIG. 1. This is done by bringing the two parts together so that the prongs of the plug 20 enter the openings in the receptacle 26 and the two parts will respectively slide together. It is to be noted that an opening 124 is provided in the top 26 and the complementary opening 126 is provided in the top ledge 86 in order to receive a bolt for fastening purposes. In a similar way openings 128 are formed adjacent the lower edge of the front face 24 (FIG. 6) and complementary openings 130 are formed in the front edge 106 in order to receive bolts 132 (FIG. 2*a*).

Figure 9:
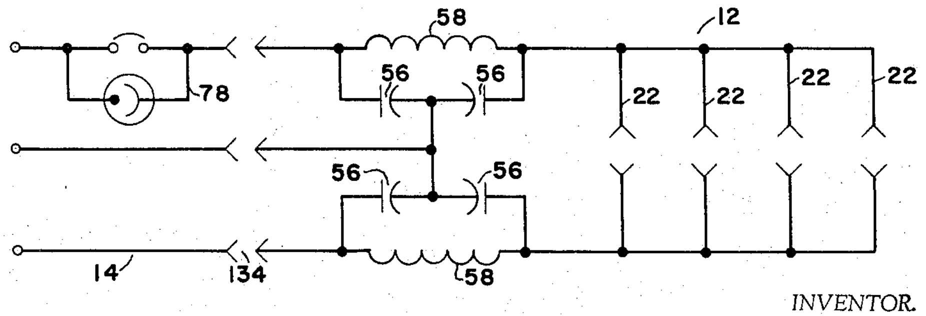
FIG. 9 is a diagram of the circuitry embodying the present invention.

The circuitry of the present device is illustrated in FIG. 9 and is shown to include service receptacles 22 in parallel with the filter components that comprise capacitors 56 and inductances 58. The detachable connection between the filter component 12 and the circuit breaker component 14 is illustrated by the numeral 134 in FIG. 9 wherein the circuit breaker 78 is indicated as a constituent of the circuit breaker component 14.

Should the filter component become immobilized for any reason whatsoever, it is necessary for the serviceman only to remove the bolts 132 and the bolt passing through the openings 124 and 126. The filter component is separated from the circuit breaker component by an upward force as by inserting a screw driver blade between the top 26 and the shelf 86. Immediately before the separation of the parts, the power is turned off. The parts are separated and a new filter component 12 is plugged into the existing circuit breaker component 14. The power may be turned on, and the aforesaid bolts tightened. It is again to be emphasized that with the present invention there is no need whatsoever to remove the circuit breaker component 14 as it is functioning in all respects and there is no need whatsoever to discard perfectly operable circuit breaker elements as was done in the previous practice wherein the entire unit had to be discarded and replaced with a new unit.

It is estimated that a skilled serviceman can perform this operation in probably less than a minute. This is a vast improvement from the previous time and material wasting practice which required the bodily removal of the combination filter-circuit breaker element with the attendant operations relating to soldering and bodily replacement of an entire new filter-circuit breaker component.

Where a new filter component is not available and the filter has now shorted out, service to subscribers beyond the point of injury may still be maintained simply by separating the filter component from the circuit breaker component. Then, the main service connection is unplugged from one of the receptacles 22 of the disabled filter component, and plugged directly into main receptacle 76 of the circuit breaker component 14. Service will be immediately resumed, although it will be of somewhat inferior quality since a necessary filter is no longer in the system. However, this is far superior to a total absence of service for a substantial period under the previous practice. When the new filter component is received, the main service connection is simply unplugged from the main receptacle 76 and replugged into one of the receptacles 22 of the new filter component after it has been plugged into main receptacle 76. Service of high quality will immediately resume.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A pluggable filter assembly for use in electronic distribution systems in connection with antennae signals comprising an upper pluggable filter component contained in a filter housing and a lower receptacle circuit breaker component contained in a receptacle housing, said filter component including a filter assembly and a male plug depending therefrom, said circuit breaker component having a main receptacle associated therewith and adapted to receive said plug said filter housing having a front wall, said receptacle housing having elongated panels defining a space for removably receiving said filter component when said male plug is received in said main receptacle whereby when said filter component is rendered inoperative, it may be replaced by simply unplugging from said circuit breaker component and plugging in of a new filter component.

2. The invention of claim 1 including service receptacles associated with said filter component.

3. The invention of claim 2 wherein a main service connection is ordinarily plugged into one of said receptacles, with said connection being adapted to be plugged into said main receptacle after said filter component has been rendered inoperative and separated from said circuit breaker component.

4. The invention of claim 1 wherein said filter housing includes a top wall which is supported by the top edges of said elongated panels when said male plug is received in said main receptacle.

5. The invention of claim 4 including a filter holding shelf extending rearwardly of said front wall, said shelf having openings to accommodate said male plug with a filter being positioned on said shelf, and service receptacles being held in openings in said front wall.

6. The invention of claim 4 including a top ledge spanning said elongated panels with said top wall being supported by said top ledge.

7. The invention of claim 6 wherein said front wall closes the span between said elongated panels.

8. The invention of claim 7 wherein said receptacle housing includes a shelf with said main receptacle being supported on said shelf, and a circuit breaker positioned below said shelf.

References Cited

UNITED STATES PATENTS

| | | | |
|---|---|---|---|
| 2,659,001 | 11/1953 | Thorne | 343—846 |
| 2,939,095 | 5/1960 | Chertok | 333—70 |

ELI LIEBERMAN, *Primary Examiner.*